United States Patent
Du et al.

(10) Patent No.: US 10,483,681 B1
(45) Date of Patent: Nov. 19, 2019

(54) INFORMATION HANDLING SYSTEM MOBILE ADAPTER WITH ROTATIONAL CABLE MANAGEMENT

(71) Applicant: Dell Products L.P., Round Rock, TX (US)

(72) Inventors: Hang Du, Singapore (SG); Benedict Tiong Chee Tay, Singapore (SG); Toshiyuki Tanaka, Mendham, NJ (US); Alvin Sitoh, Singapore (SG); Shiong Kheng Chua, Singapore (SG); Wong Hin Loong Justin, Singapore (SG); Ting Yeow Hoong, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/971,124

(22) Filed: May 4, 2018

(51) Int. Cl.
| | |
|---|---|
| H01R 13/502 | (2006.01) |
| G06F 3/06 | (2006.01) |
| H01R 43/20 | (2006.01) |
| H01R 13/66 | (2006.01) |
| H04L 29/06 | (2006.01) |
| H01R 13/42 | (2006.01) |

(52) U.S. Cl.
CPC ......... *H01R 13/502* (2013.01); *G06F 3/0661* (2013.01); *H01R 13/42* (2013.01); *H01R 13/665* (2013.01); *H01R 43/20* (2013.01); *H04L 69/08* (2013.01)

(58) Field of Classification Search
CPC .... H01R 13/502; H01R 13/665; H01R 13/42; H01R 43/20; H04L 69/08; G06F 3/0661
See application file for complete search history.

(56) References Cited

U.S. PATENT DOCUMENTS

| | | | |
|---|---|---|---|
| 5,094,396 A | 3/1992 | Burke | |
| 9,404,645 B1 | 8/2016 | Feng | |
| 2006/0261203 A1* | 11/2006 | Yang | B65H 75/4431 242/378.4 |
| 2008/0292261 A1* | 11/2008 | Kowalczyk | G02B 6/3897 385/135 |
| 2015/0016782 A1* | 1/2015 | Su | G02B 6/4279 385/88 |
| 2015/0111398 A1* | 4/2015 | Isenhour | H01R 13/6205 439/39 |

(Continued)

OTHER PUBLICATIONS

Singleton, "The Arc Hub is the best USB-C Hub for right now", May 19, 2017, The Verge (Year: 2017).*

(Continued)

*Primary Examiner* — Idriss N Alrobaye
*Assistant Examiner* — Ronald T Modo
(74) *Attorney, Agent, or Firm* — Zagorin Cave LLP; Robert W. Holland

(57) ABSTRACT

A mobile peripheral adapter has plural data and plural video ports disposed along a perimeter of a circular housing having first and second rotationally coupled portions. One housing portion includes electronic components for adapting USB information into selected of plural outputs protocols, the electronic components interfaced with the data and video ports and a USB cable. The other housing portion includes a cable guide that engages with the USB cable to retract and extend the USB cable at the housing.

18 Claims, 16 Drawing Sheets

(56) References Cited

U.S. PATENT DOCUMENTS

| | | | |
|---|---|---|---|
| 2016/0156137 A1 | 6/2016 | Pan | |
| 2016/0209885 A1* | 7/2016 | Ellis | H01R 31/065 |
| 2016/0308315 A1* | 10/2016 | Horng | H01R 24/62 |
| 2017/0245388 A1 | 8/2017 | Morris | |
| 2017/0321853 A1* | 11/2017 | Chien | H02J 7/0027 |

OTHER PUBLICATIONS

Anonymous author, "USB-C PD Universal Dock User Guide", Apr. 2018, Media Gear (Year: 2018).*

Targus, "USB Multi-Display Adapter—Black," downloaded from https://www.targus.com/uk/usb-multi-display-adapter-black-aca928euz, Jul. 20, 2018, 3 pages.

Dell, "Software Driver Download Guide Dell 4-in-1 Adapter (DA100)," downloaded from https://downloads.dell.com/manuals/all-products/esuprt_electronics/esuprt_usb_accessories/dell-universal-dongle-da100_reference%20guide_en-us.pdf, Jul. 20, 2018, 1 page.

Geerling, J., "Review: Arc Hub USB-C Adapter," downloaded from https://www.jeffgeerling.com/blog/2017/review-arc-hub-usb-c-adapter, Jul. 20, 2018, 8 pages.

* cited by examiner

INFORMATION HANDLING SYSTEM MOBILE ADAPTER WITH ROTATIONAL CABLE MANAGEMENT

CROSS REFERENCE TO RELATED APPLICATION

U.S. patent application Ser. No. 15/971,099, entitled "Information Handling System Mobile Adapter with Video and Communications Circuit Boards" by inventors Wong Hin Loong Justin, Shiong Kheng Chua, Hang Du, Benedict Tiong Chee Tay, Toshiyuki Tanaka, Alvin Sitoh, and Ting Yeow Hoong, filed on even date herewith, describes exemplary methods and systems and is incorporated by reference in its entirety.

BACKGROUND OF THE INVENTION

Field of the Invention

The present invention relates in general to the field of information handling system peripherals, and more particularly to an information handling system mobile adapter with rotational cable management.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often interact with external peripherals and network communications resources through cabled interfaces, such as data and video ports. Generally, information handling systems include Universal Serial Bus (USB) Type A and/or Type C ports to connect with peripherals, such as a mouse and keyboard. In some instances, information handling systems will include network communication ports, such as an Ethernet RJ45 port. In addition, information handling systems often include one or more display peripheral ports for communication of video information to a display. For example, information handling systems communicate video information to a peripheral display through a variety of display cables and protocols, such as Video Graphics Array (VGA) cable, a DisplayPort cable and a High Definition Multimedia Interface cable. Generally, in order to interface an information handling system with a display, both the information handling system and display have to have the same cable connection ports. If only dissimilar video ports are available, such as a VGA port on a display and an HDMI port on an information handling system, converter "dongles" can sometimes be used to interface the information handling system and display. Such dongles include processing resources within the cable that convert video information in a protocol provided from the information handling system to a protocol accepted by the display.

End users tend to prefer portable information handling systems that have a minimal footprint and weight because such systems provide improved convenience on the go. Smaller housing sizes have reduced the amount of room available for including communications and video ports in an information handling system. For example, RJ45 Ethernet ports and VGA video ports each have a height that makes their inclusion in a low profile information handling system housing prohibitive. In some instances, low profile information handling systems will only include a single USB port that is used for both power and data communications. In such instances, communication of video from an information handling system to an external display typically relies upon wireless protocols or a dongle that translates video information from USB to a compatible video format. An end user generally must have a dongle that performs a protocol conversion for each type of video protocol the end user must perform.

To improve end user convenience, some mobile adapters include multiple protocol conversion capabilities in one housing. For example, the Dell DA100 and DA200, the Bourge Arc Hub, and the Targus USB multi-display adapter all provide multiple video protocol outputs with multiple ports disposed in portable adapter housing. Such mobile adapters typically include a cable with a USB plug that couples to an information handling system, such as USB Type C plug that handles both video and communications data. One difficulty that arises with such mobile adapters is that the cable often hangs freely from the mobile adapter in an awkward manner that makes storage of the mobile adapter difficult. Another difficulty that arises with such mobile adapters is that the multiple ports tend to have a relatively large footprint along the housing length that increases the size of the mobile adapter. Each data and video port can potentially carry a large stream of information, especially where video is provided in high definition and data includes broadband network communications. As a result, compressed footprints that involve multiple video and data communications paths tend to have difficulty maintaining desired data rates due to crosstalk and other electromagnetic interference issues.

SUMMARY OF THE INVENTION

Therefore, a need has arisen for a system and method which supports multiple ports in an adapter with a reduced footprint.

A further need exists for a system and method which manages signal interference for communications having different protocols for communication and data.

In accordance with the present invention, a system and method are provided which substantially reduce the disadvantages and problems associated with previous methods and systems for a mobile adapter having multiple ports that output data and video signals. A circular shaped housing disposes video and data ports about a perimeter in a first portion and a communications cable in a second portion rotationally coupled to the first portion. The communications cable retracts and extends based upon rotation of the housing portions relative to each other. The communications cable terminates at one end with a data plug, such as USB Type C plug, that interfaces with an information handling system to communicate video and other data with electronic components disposed in the adapter. The communications cable terminates at an opposing end with plural wirelines, including data and power wirelines that couple to a communications printed circuit board and video wirelines that couple to a separate video printed circuit board.

More specifically, an information handling system processes information with processing components disposed in a portable housing and communicates the information through a communications port of the portable housing, such as a USB Type C port. A mobile adapter peripheral having an integrated cable and connector plug interfaces with the information handling system communications port by inserting the plug and establishing communication with a protocol of the port, such as a USB Type C protocol that communicates video and other types of information. The mobile adapter peripheral integrates the cable and plural circuit boards in circular housing having upper and lower portions that rotate relative to each other to retract and extend the cable. In one embodiment, a lower portion defines a cable guide having an opening in a sidewall. As the lower portion rotates relative to the upper portion, the opening changes positions relative to the plug end of the cable, effectively extending and retracting the cable relative to the housing. A magnet disposed proximate the opening attracts the plug into the housing as the housing portion rotation brings the cable to the retracted configuration so that the plug retracts to within the housing at the closed configuration. The opening has chamfered edges formed about its periphery that interact with a tapered base of the plug to funnel the plug into the housing upon complete rotation of the housing portions.

In one example embodiment, the mobile adapter peripheral includes both video ports, such as VGA, DisplayPort and HDMI ports, and data ports, such as RJ45 network and USB ports. The cable has plural wirelines that communicate video information, such as is defined by the DisplayPort and USB Type C standards, and other wirelines that communicate power and data, such as is defined by the USB Type C standard. In order to provide improved signal transfer, video wirelines couple directly to a video printed circuit board while the remaining power and data lines couple directly to a communications printed circuit board. A flexible cable couples the video and communications circuit boards to each other to provide power, ground and slow speed control communications from the communications circuit board to the video circuit board. Video information from the information handling system communicates directly to the video circuit board for output to video ports coupled to the video circuit board, such as VGA, DisplayPort and HDMI ports. Control of video processing is provided through USB communications to the communication circuit board, which in turn sends commands to the video circuit board through the flexible circuit. Separation of the video components to a circuit separate from the communications components reduces the risk of crosstalk or other interference during high data rate communications.

The present invention provides a number of important technical advantages. One example of an important technical advantage is that a mobile adapter peripheral has a compact circular housing footprint that extends and retracts a communications cable with a rotational movement of housing portions relative to each other. A cable guide defined within the housing by the housing portions drives cable retraction and extension without a need for separate mechanisms or assemblies. Full retraction of the cable is accomplished by biasing the cable plug into the housing with a magnet integrated in the housing. Chamfered edges of an opening of the circular housing interacts with a tapered base at the cable and plug connection to funnel the plug into the opening upon complete retraction of the cable without risk of the plug getting trapped at the periphery of the housing. The cable travels from the cable guide and into an electronics portion of the housing through a central opening that avoids stress on the cable during retraction and extension. Wirelines extending from the cable end couple separately to communications and video circuit boards while a flexible cable communicates power and commands between the communication and video circuit boards. Separate circuit boards reduce cross talk and other interference for signals managed from an information handling system. In addition, separate circuit boards ease assembly of electronics into the housing by allowing each set of ports to rotate and couple into housing openings without all ports have to fit in one assembly step. Simplified assembly into the circular footprint reduces cost and improves appearance of the complete adapter with an elegant and easy to handle circular housing.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system mobile adapter peripheral retracts and extends a cable with rotation of housing portions that include separate communications and video circuit boards. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
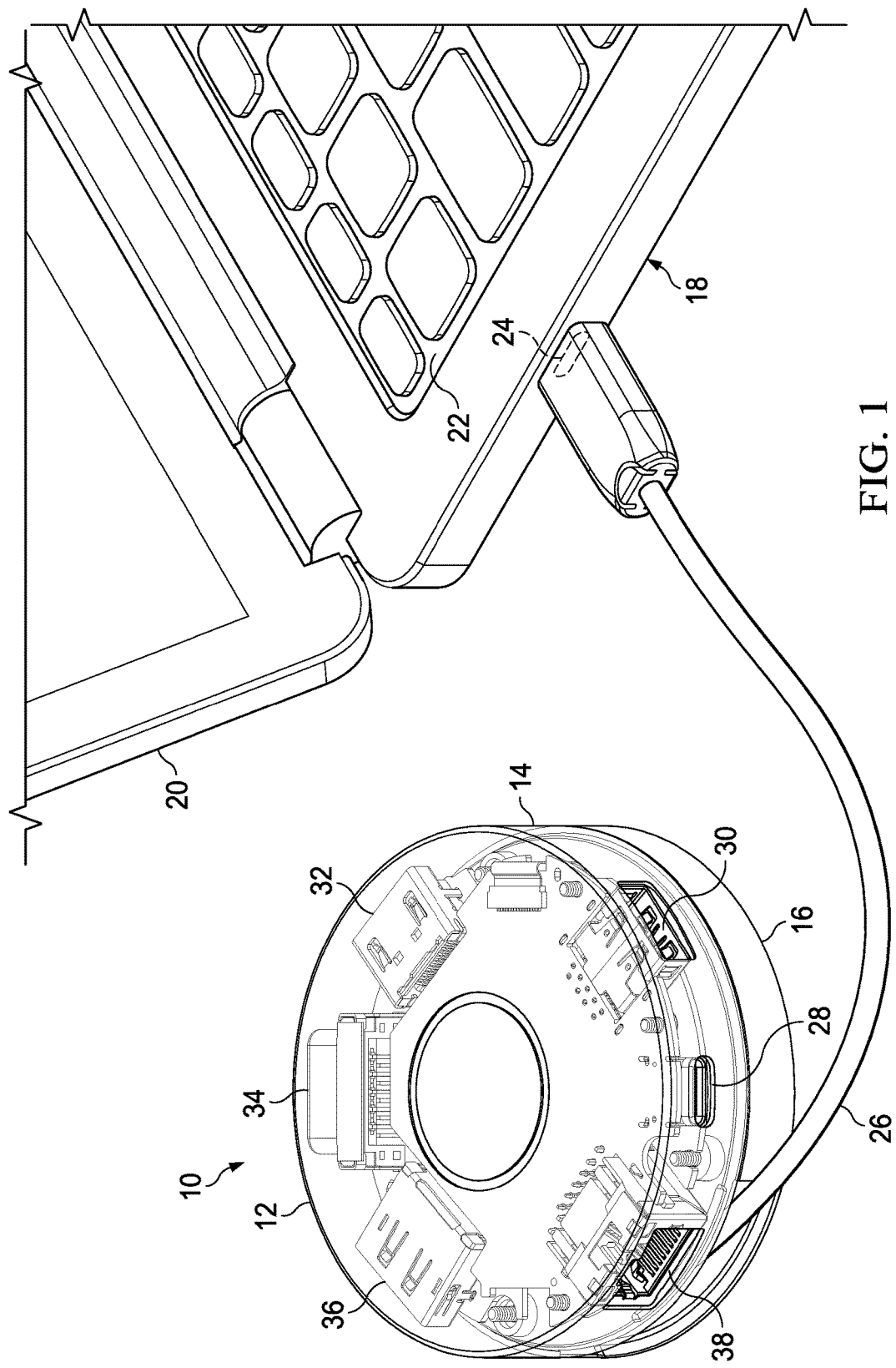
FIG. 1 depicts an upper perspective view of a mobile adapter peripheral with a circular housing having an upper electronics portion rotationally coupled to a lower cable portion.

Referring now to FIG. 1, an upper perspective view depicts a mobile adapter peripheral 10 with a circular housing 12 having an upper electronics portion 14 rotationally coupled to a lower cable portion 16. In the example embodiment, mobile adapter peripheral 10 interfaces with a portable information handling system 18 to support information handling system functionality, such as communication with input/output (I/O) devices, other peripherals and network cables. For instance, information handling system 18 integrates processing components, such as a CPU and memory, which cooperate to execute instructions to accept end user inputs at a keyboard 22 and present end user output at a display 20. Information handling system 18 interfaces with mobile adapter peripheral 10 through a cable 26 that couples to a port 24, such as a USB Type C port and cable. Once information handling system 18 communicatively couples to mobile adapter peripheral 10, a plurality of functional ports of mobile adapter peripheral 10 become available as communication pathways to peripheral devices and/or network interfaces. In the example embodiment, mobile adapter peripheral 10 includes a USB Type C port 28, a USB Type A port 30, and HDMI port 32, a VGA port 34, a DisplayPort port 36 and an RJ45 port 38. Processing components disposed in the upper electronics portion 14 translate communications between protocols of each port and the USB Type C protocol of portable information handling system 18. For instance, information handling system 18 may send pixel values that define display images through cable 26 to processing components of upper electronics portion 14 that, in turn, send the pixel values out a selected of HDMI port 32, VGA port 34 or DisplayPort port 36. As another example, information handling system 18 supports peripheral device and/or network communication through cable 26 with RJ45 port 38, USB Type C port 28 and/or USB type A port 30. Essentially, the processing components in upper electronics portion 14 combine multiple protocol conversion "dongles" into one housing 12 so that a single USB Type C port supports multiple protocols. A similar system that combines dongles into one housing is the DA200 sold by Dell Inc.

Mobile adapter peripheral 10 provides cable management of cable 26 by rotational movement of lower cable portion 16 relative to upper electronics portion 14. In the example depicted by FIG. 1, cable 26 has extended outwards from housing 12 by rotation of the lower cable portion 16 clockwise relative to electronic cable portion 14. To retract cable 26 into lower cable portion 16, lower cable portion 16 rotates counterclockwise relative to electronic cable portion 14. Cable 26 has a length and product size that optimizes cable operation so that sufficient length exists in the extended configuration to allow mobile adapter peripheral 10 to rest out of the way of information handling system 10 when cable 26 inserts into port 24. Cable 26 has a length short enough so that rotation of the housing portions to retract cable 26 provides a complete retraction that does not expose cable 26 outside of housing 12. For example, in one embodiment, a guide integrated between electronic housing portion 14 and cable housing portion 16 engages cable 26 during rotation so that cable 26 is fully retracted within housing 12 based upon approximately 360 degrees of rotation of the housing portions relative to each other. Rotation to both extend and retract cable 26 provides an intuitive system that is simple for end users to understand. Complete encapsulation of cable 26 within housing 12 in the retracted configuration enhances product robustness and reliability. As is set forth in greater detail below, cable management between the retracted and extended positions is provided with a guide integrated in the housing that enhances robustness because standalone parts, coil springs and other separate mechanical parts are not needed.

Figure 2:
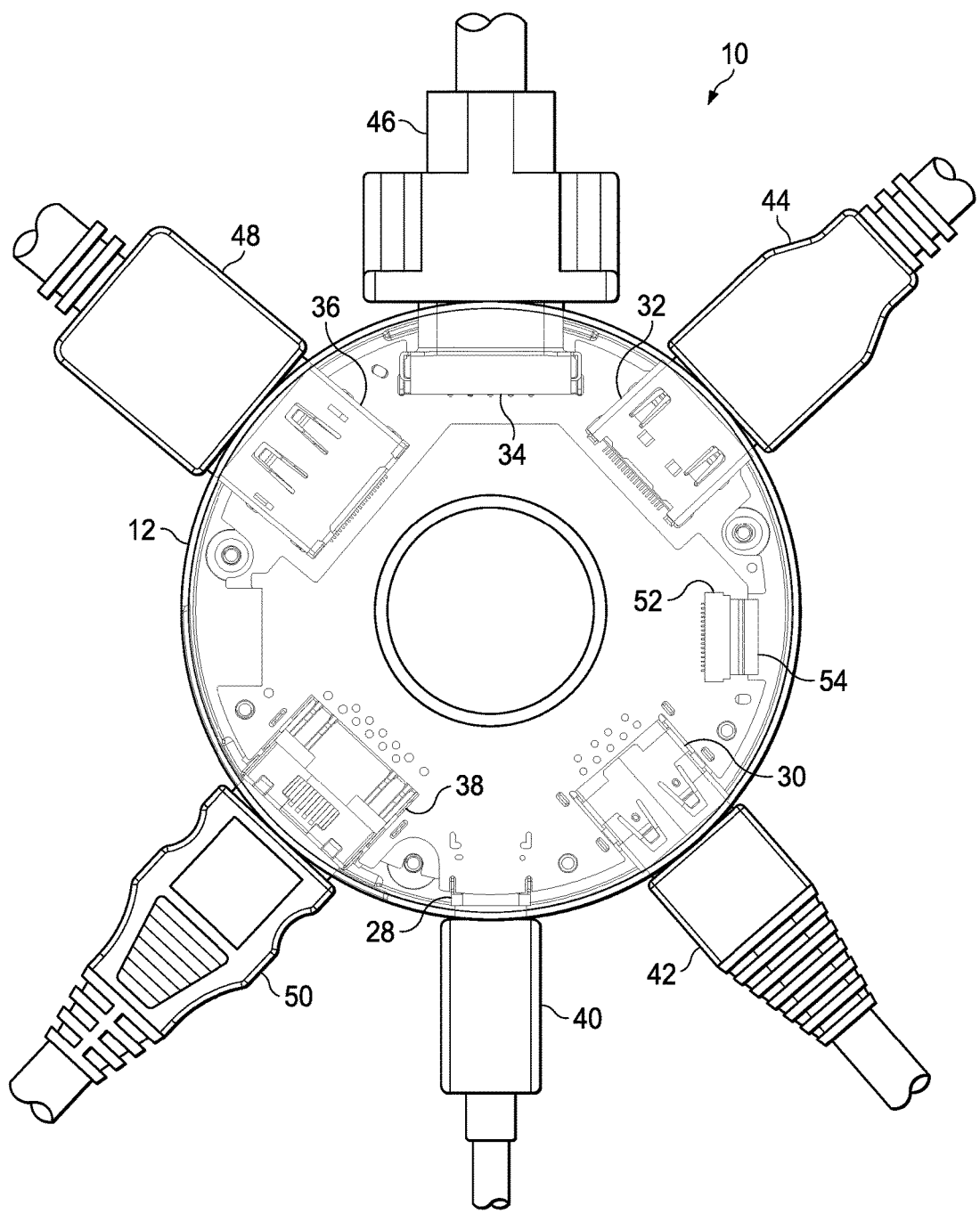
FIG. 2 depicts a top view of mobile adapter peripheral having a circular configuration of I/O ports coupled with external cables.

Referring now to FIG. 2, a top view of mobile adapter peripheral 10 depicts a circular configuration of I/O ports coupled with external cables. In the example embodiment, a USB Type C cable 40 couples to a USB Type C port 28, a USB Type A cable 42 couples with USB Type A port 30, an HDMI cable 44 couples with an HDMI cable 32, a VGA cable 46 couples to VGA port 34 and an RJ45 Ethernet couples to RJ45 port 38. As is set forth in greater detail below, fitting six I/O ports into a circular pattern within housing 12 having a circular form factor presents difficulty. For example, each port aligns at defined or standardized positions relative to the circumference of housing 12. In one embodiment, to aid in the circular configuration of ports 28-38, two separate printed circuit boards are assembled in housing 12 that each support less than all of ports 28-38. For example, one circuit boards supports communication-related ports, such as USB ports 28 and 30 and RJ45 port 38, while a second circuit port supports display-related ports, such as HDMI port 32, VGA port 34 and DisplayPort port 36. As is shown in greater detail below, the separate circuit boards interface power and ground through a flexible cable 54 that couples with a connector 52.

Figure 3:
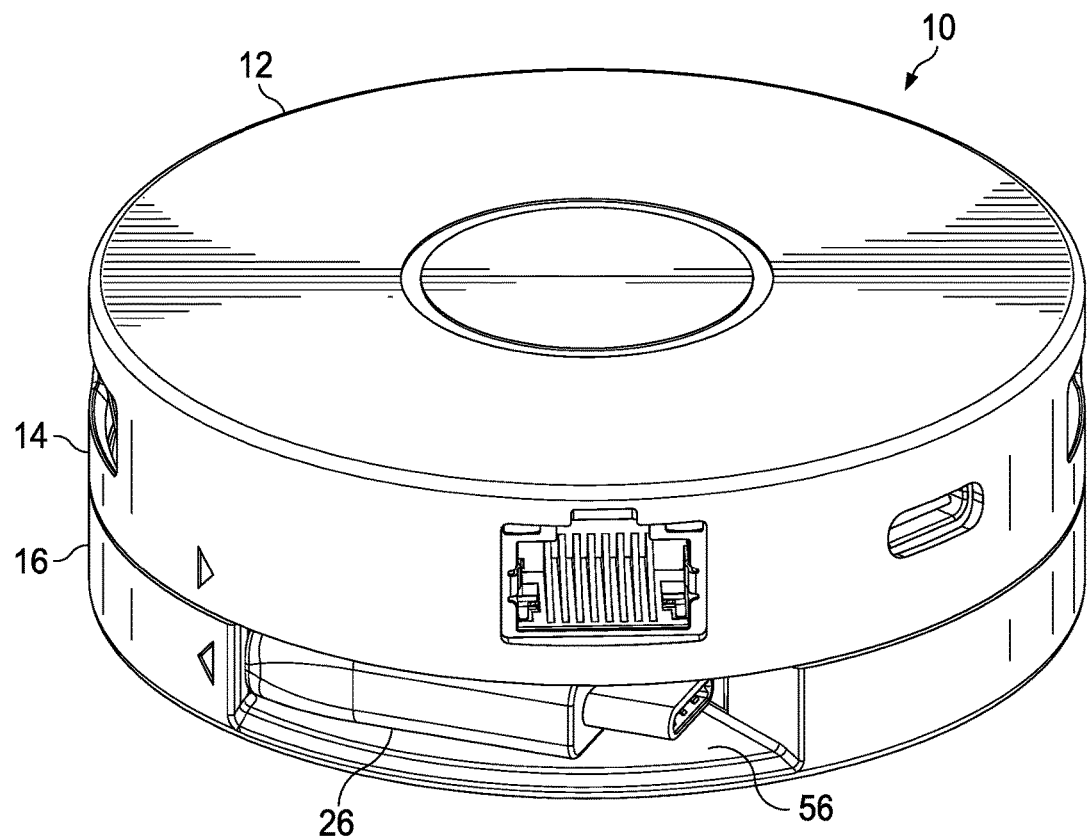
FIG. 3 depicts a side perspective view of the mobile adapter peripheral having a cable in a retracted configuration.

Referring now to FIG. 3, a side perspective view depicts mobile adapter peripheral 10 having cable 26 in a retracted configuration. Housing 12 portions 16 and 14 rotate relative to each other to retract cable 26 into a cable opening 56 formed in the lower cable housing portion 16. In the retracted configuration, cable 26 is fully retracted to within housing 12 so that the end of cable 26 will not face a risk of damage during transport of housing 12.

Figure 4:
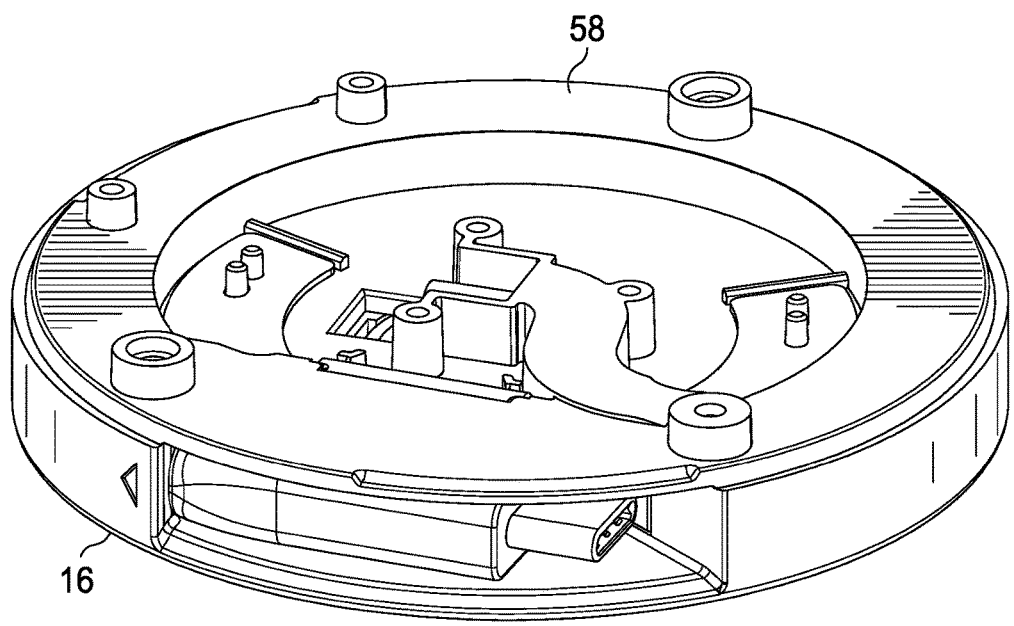
FIG. 4 depicts a side perspective view of the lower cable housing portion with the upper electronic housing portion removed to expose a middle housing portion.

Referring now to FIG. 4, a side perspective view depicts lower cable housing portion 16 with upper electronic housing portion 14 removed to expose a middle housing portion 58. The upper surface of middle housing portion 58 supports electronics components, such as printed circuit boards, that perform data protocol conversions to communicate data into and/or out of ports 28-38. The bottom surface of middle housing portion 58 includes a cable guide so that, as middle housing portion 58 rotates relative to lower cable housing portion 16, cable 26 extend or retracts relative to housing 12.

Figure 5:
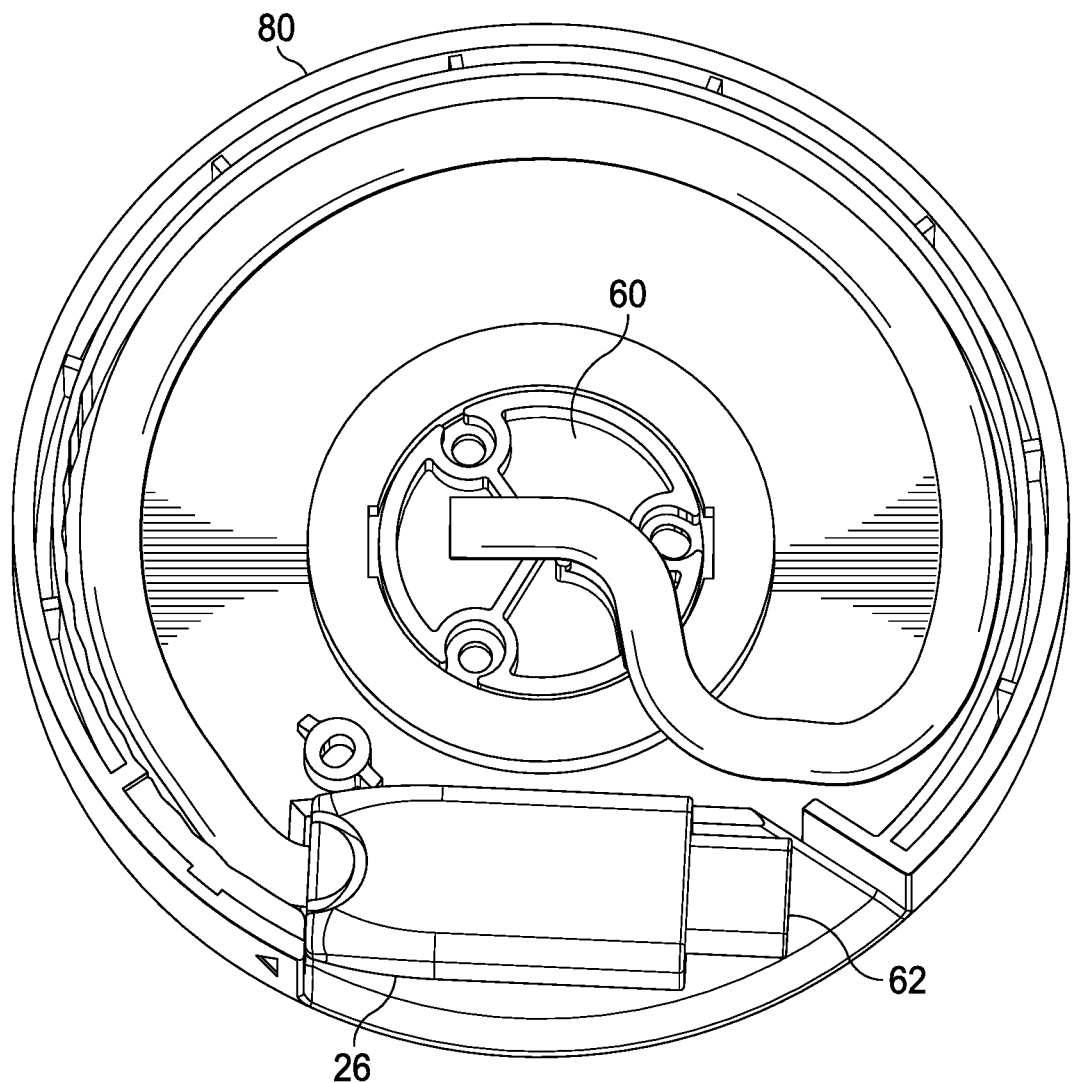
FIG. 5 depicts a top view of a lower cable housing portion having a cable disposed in a retracted configuration at an outer circumference.

Referring now to FIG. 5, a top view depicts lower cable housing portion 16 having cable 26 disposed in a retracted configuration at an outer circumference. A centrally-disposed spindle 60 has three openings that accept screws to couple with middle housing portion 58. Spindle 60 provides rotation relative to lower cable housing portion 16 by affixing relative to middle housing portion 58. Cable 26 routes into the electronics housing portion 14 through a central location at spindle 60. Plug 62 fits within lower cable housing 16 to fully retract upon complete rotation of lower cable housing 16 to a retracted configuration. In the example embodiment, cable 26 is routed by a cable guide of middle housing portion 58 to proceed from the central location towards an outer wall 80 of lower cable housing portion 16, and then around the perimeter of lower cable housing portion 16 against the outer wall 80. As lower cable housing portion 16 rotates counterclockwise, plug 62 and cable 26 are pressed out of housing 12, with the cable guide gradually rotating from the depicted retracted position to align with opening 56. As lower cable housing portion 16 rotates clockwise, the cable guide moves from alignment with opening 56 to out of alignment, thus retracting cable 26 so that cable 26 is drawn against outer wall 80. The cable 26 length provides for rotation of the cable guide out of alignment as depicted by FIG. 5 so that a maximum cable extension is available based on the circumference of housing 12 that allows a full retraction of plug 62 at substantially 360 degrees of rotation of housing portions 14 and 16 relative to each other.

Figure 6:
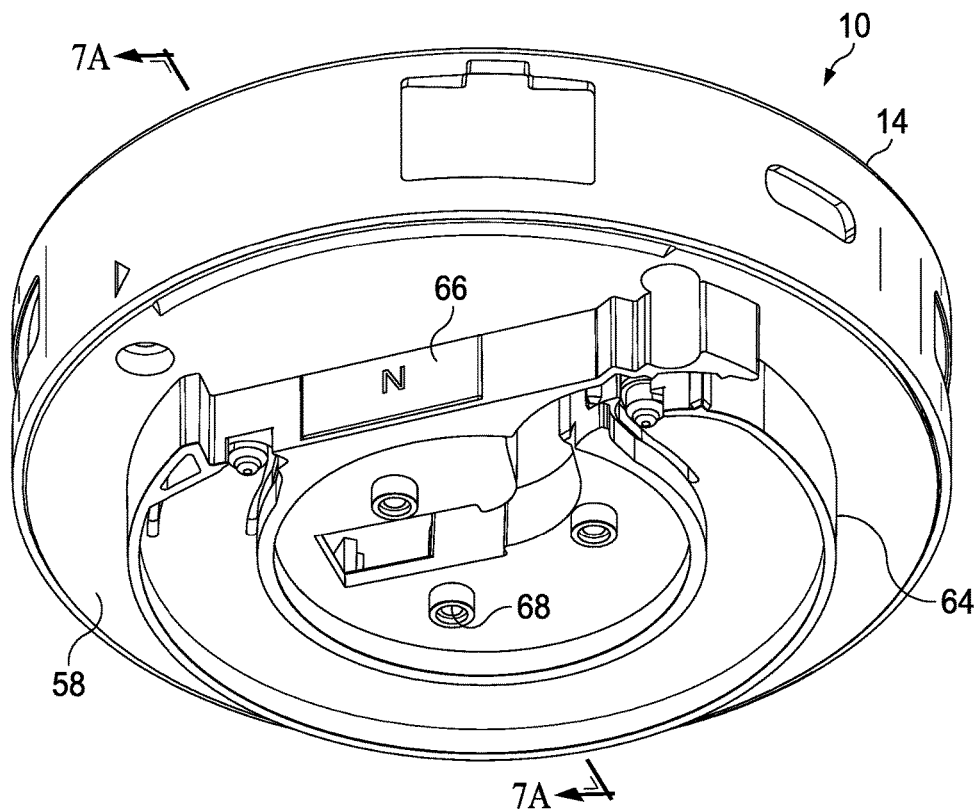
FIG. 6 depicts a bottom perspective view of an upper electronics housing portion having a middle housing portion coupled to its bottom face.

Referring now to FIG. 6, a bottom perspective view depicts upper electronics housing portion 14 having middle housing portion 58 coupled to its bottom face. A cable guide 64 extends downward from middle housing portion 58 and into lower cable housing portion 16 to engage cable 26. For example, cable guide 64 maintains cable 26 along the perimeter of housing 12 during rotation to encourage cable extraction and retraction in response to rotational movement. A magnet 66 integrates in cable guide 64 at the location where plug 62 rests when fully retracted into housing 12. Screw openings 68 align to accept screws that couple spindle 60 to middle housing section 58. To extract cable 26, the assembly of upper electronics housing portion 14 and middle housing portion 58 rotate relative to cable housing portion 16 and cable 26 within it so that magnet 66 moves away from plug 62, allowing plug 62 to release and extend out of housing 12. To retract cable 26, the assembly of upper electronics housing portion 14 and middle housing portion 58 rotate relative to cable housing portion 16 and cable 26 to that magnet 66 comes within range to attract plug 62 into housing 12.

Figure 7A:
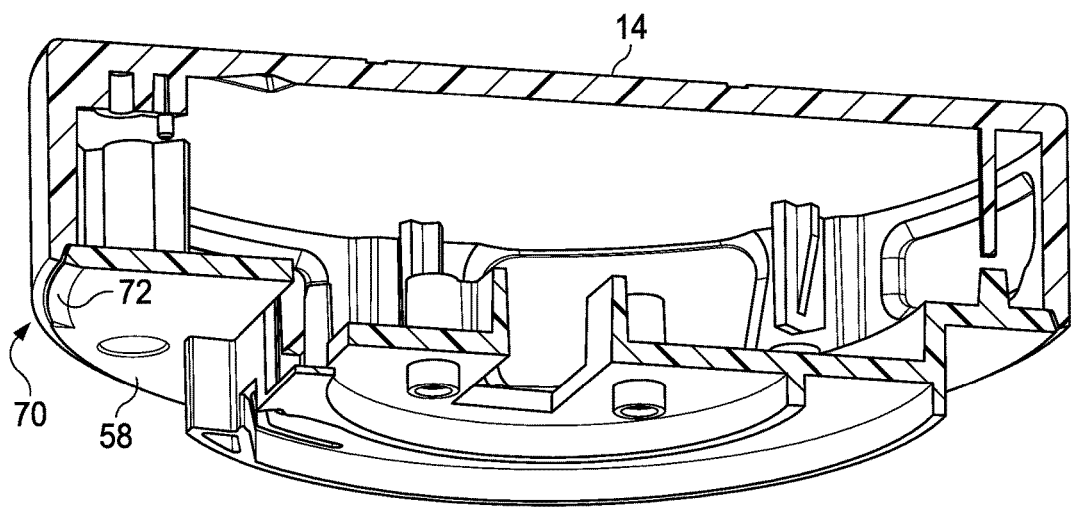
FIGS. 7A, 7B and 7C depict side cutaway views of chamfer and blend lead-in features of the housing that aid in guidance of the cable to retract and extend from the housing.
Figure 7B:
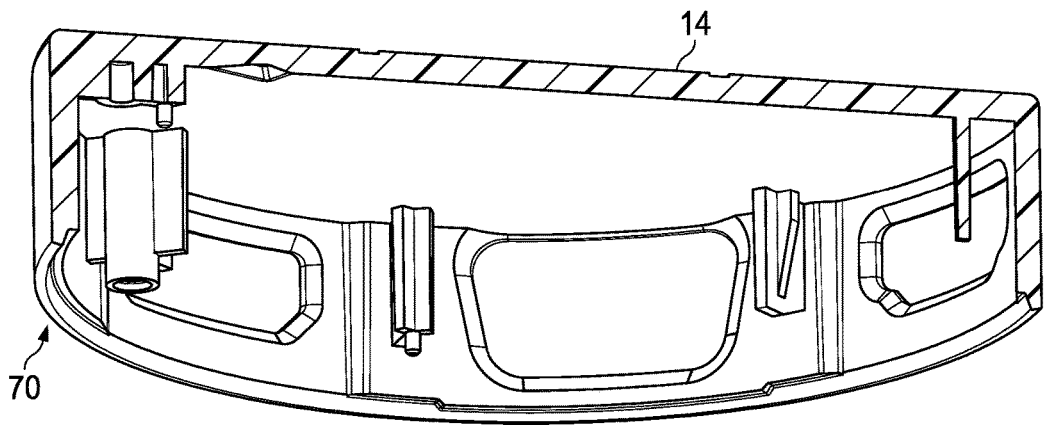
Figure 7C:
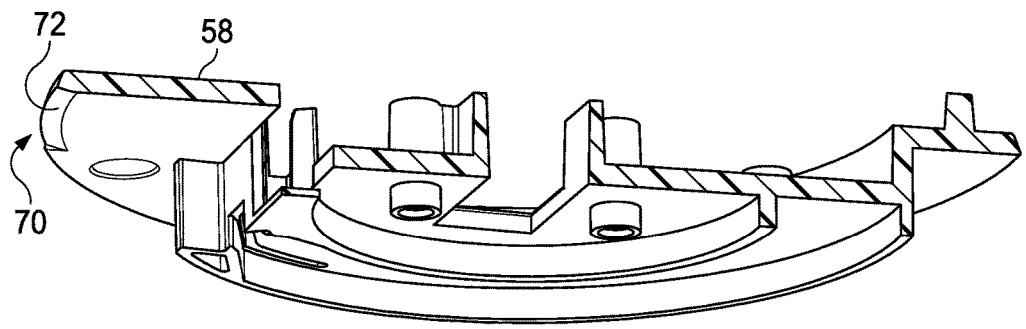

Referring now to FIGS. 7A, 7B and 7C, side cutaway views depict chamfer and blend lead-in features of housing 12 that aid in guidance of cable 26 to retract and extend from housing 12. FIG. 7B depicts a lead in feature 70 formed in electronic housing portion 14 that extends downward and blends with a lead in feature 72 and radius feature 74 of middle housing portion 58 depicted in FIG. 7C to provide a guiding surface for plug 62 that prevents plug 62 from getting stuck against housing 12 while exiting and entering housing 12. The assembled blended structure as depicted in FIG. 7A increases the height of the entry zone of plug 62. Middle housing portion 58 radius edge 74 extends close to housing portion 14's chamfer feature 70 to support hands off plug 62 interactions with housing 12.

Figure 8:
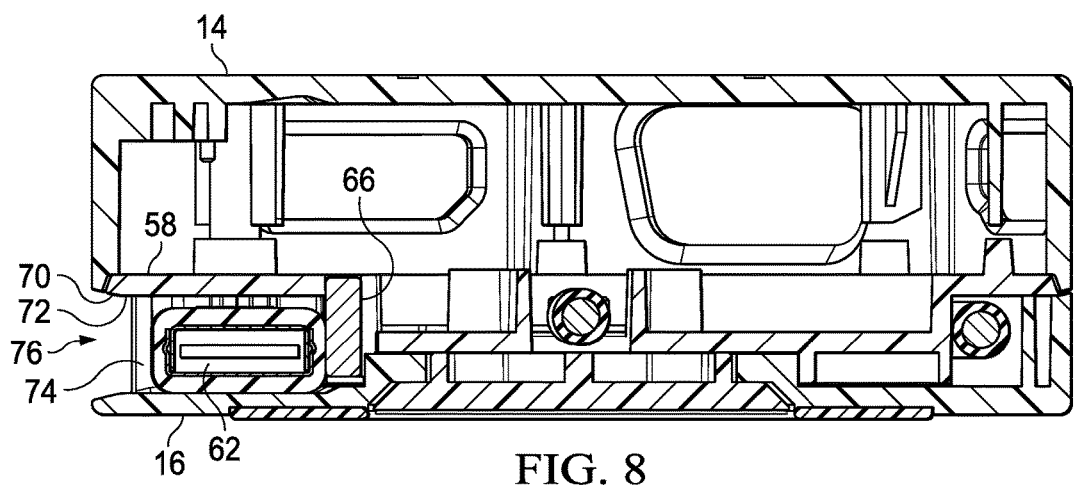
FIG. 8 depicts a side cutaway view of the housing having the plug retracted to a home position and aligned to guide outward to an extended position with chamfered edges along an opening.

Referring now to FIG. 8, a side cutaway view of housing 12 depicts plug 62 retracted to a home position and aligned to guide outward to an extended position with chamfered edges along an opening 76. The chamfer and blend feature created by interactions of surfaces 70-74 drive plug 62 to the home position with a minimal Z-height relative to the height of plug 62. In the example embodiment, opening 76 has a Z-height of 7 mm that guides plug 62 having a height of 6.1 mm, which adheres to the USB C standards. Metal or ferromagnetic material embedded in plug 62 is attracted to magnet 66 to bias plug 62 to the home position.

Figure 9A:
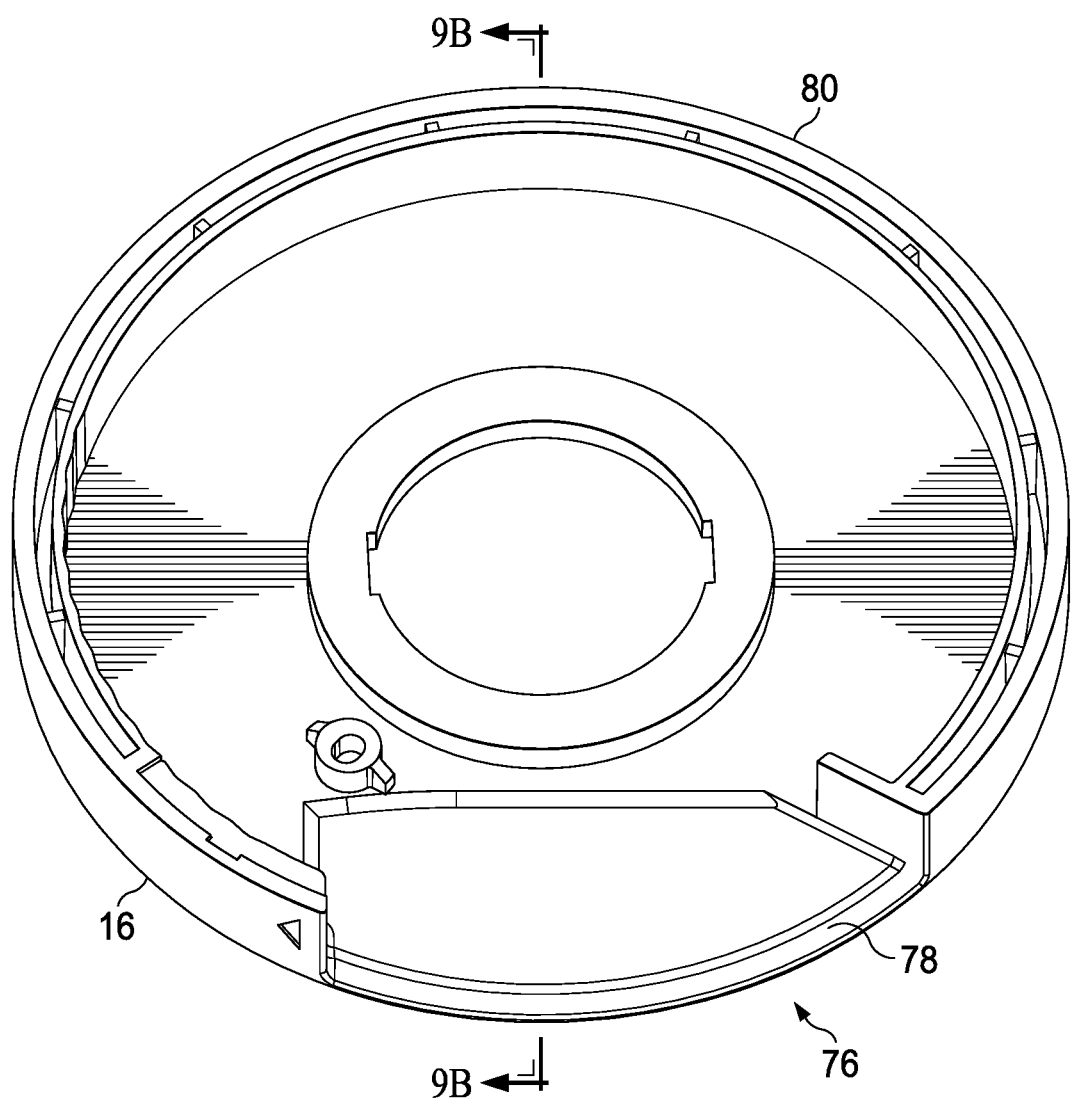
FIGS. 9A and 9B depict a top perspective view of lead in chamfer features of the lower cable housing portion that aid in guidance of the plug into the housing.
Figure 9B:
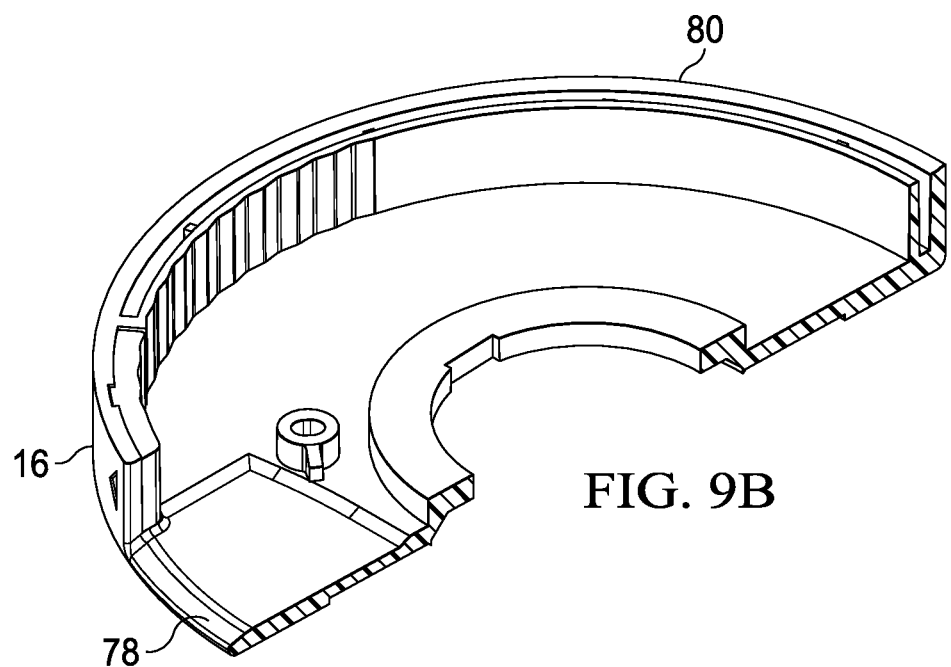

Referring to FIGS. 9A and 9B, a top perspective view depicts lead in chamfer features 78 of lower cable housing portion 16 that aids in guidance of plug 62 into housing 12. An outer wall 80 of cable housing portion 16 cooperates with the cable guide of middle portion 58 to define a channel within housing 12 to capture cable 26. As a result, as cable portion 16 rotates relative to middle portion 58, the relative location of opening 76 changes compared to the position of cable 26 within the defined channel between outer wall 80 and cable guide 64. In effect, cable 26 remains stationary relative to electronics portion 14 as cable portion 16 rotates to retract and extract cable 26 within the cable channel.

Figure 10:
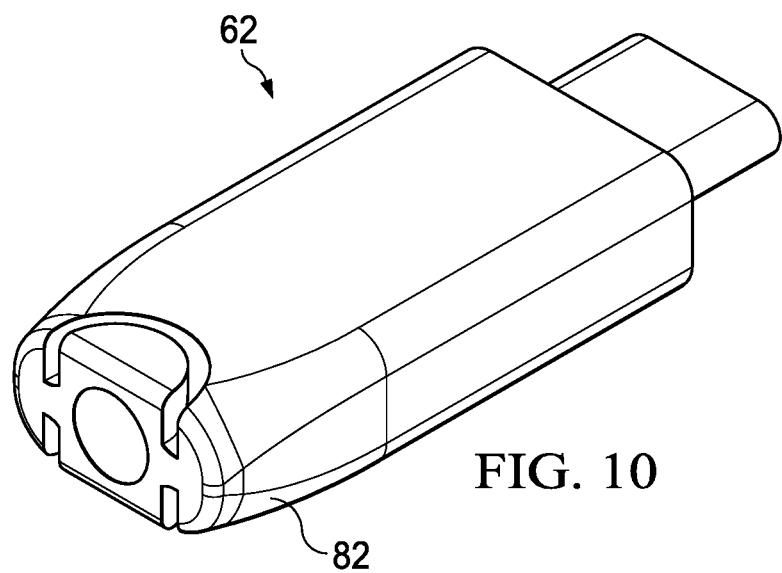
FIG. 10 depicts an upper perspective view of a cable plug having chamfered edges to aid in retraction and extension of the cable within the housing.

Referring now to FIG. 10, an upper perspective view depicts cable plug 62 having chamfered edges 82 to aid in retraction and extension of cable 26 within housing 12. Chamfered edges 82 couple over cable strain relief features to define an arrow shape between cable 26 and plug 62. In combination with chamfered edges defined by housing 12, retraction of plug 62 into opening 76 to a home position avoids any catches on the structure of housing 12 that would place strain on cable 26.

Figure 11:
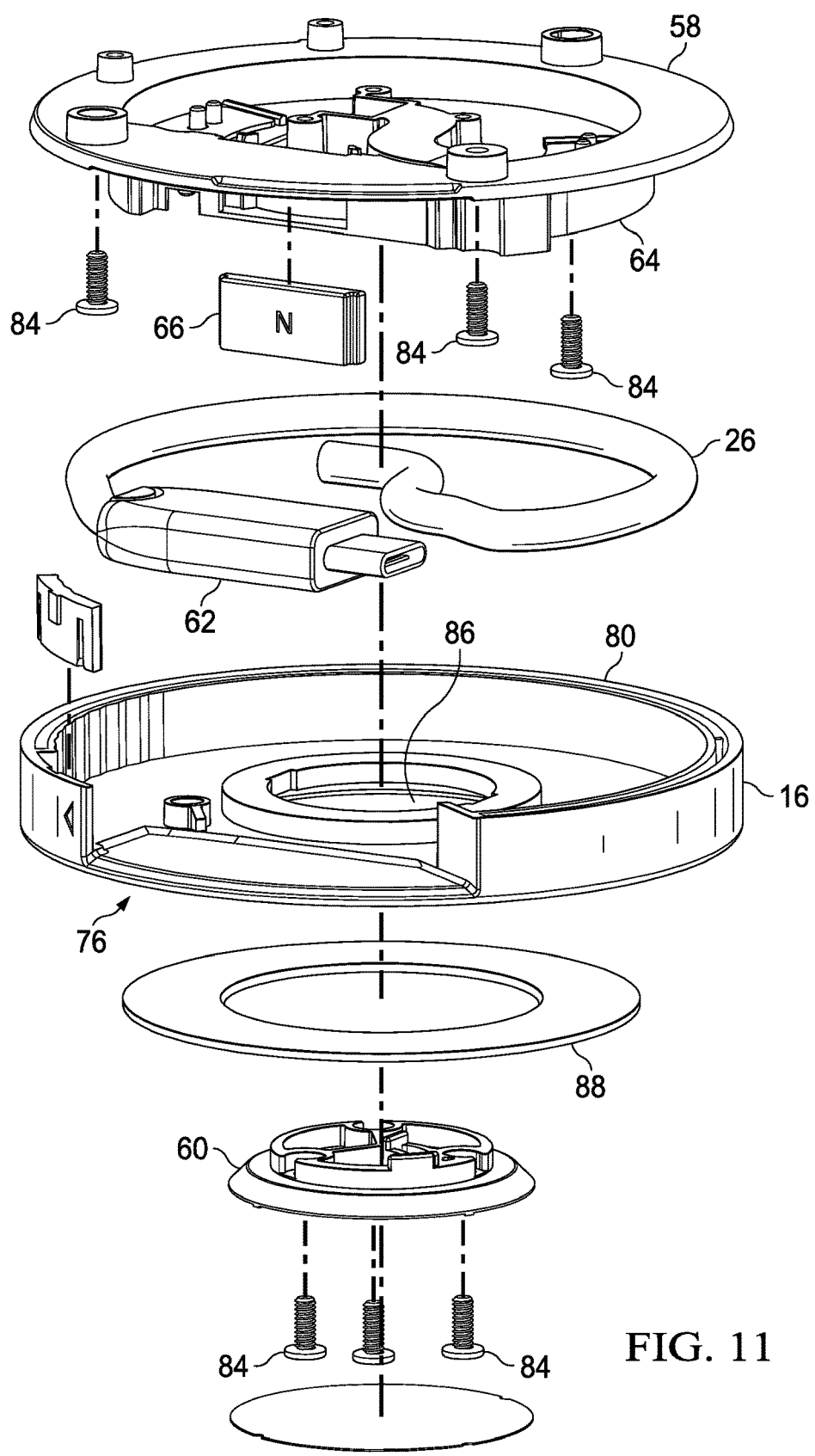
FIG. 11 depicts an exploded view of the assembly of the middle housing portion to the cable housing portion to define a cable channel that guides the plug into and out of the housing.

Referring now to FIG. 11, an exploded view depicts the assembly of middle housing portion 58 to cable housing portion 16 to define a cable channel that guides plug 62 into and out of housing 12. Screws 84 pass through spindle 60 and the opening 86 in the center of cable housing portion 16 to couple to middle housing portion 58. A base cushion 88 couples to the bottom of housing portion 16 to cushion against a resting surface. Cable housing portion 16 includes an outer wall 80 that defines a cable channel with the cable guide 64 of middle housing portion 58. Rotation of cable housing portion 16 relative to spindle 60 and middle housing portion 58 changes the position of opening 76 relative to plug 62, effectively retracting and extracting cable 26. Magnet 66 bias plug 62 into housing 12 as opening 76 rotates to align with plug 62. A central screw 84 couples cable 26 at a central location of middle housing portion 58. Two other screws 84 pass through screw openings of middle housing portion 58 to fixedly couple middle housing portion 58 to upper electronics housing portion 14.

Figure 12A:
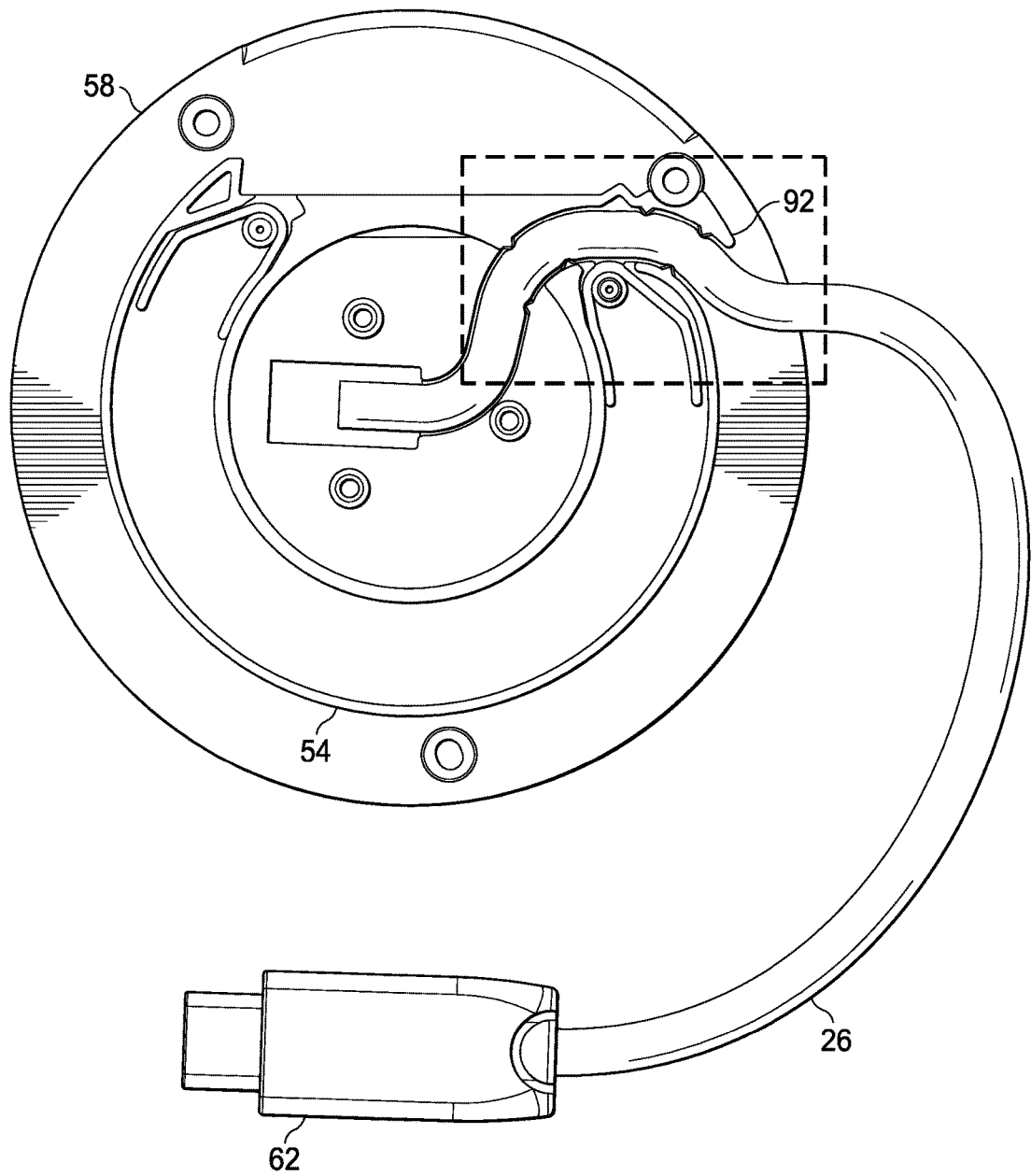
FIGS. 12A and 12B depict a bottom view of cable guided by middle housing portion to a center location through which cable passes to the upper electronics housing portion.
Figure 12B:
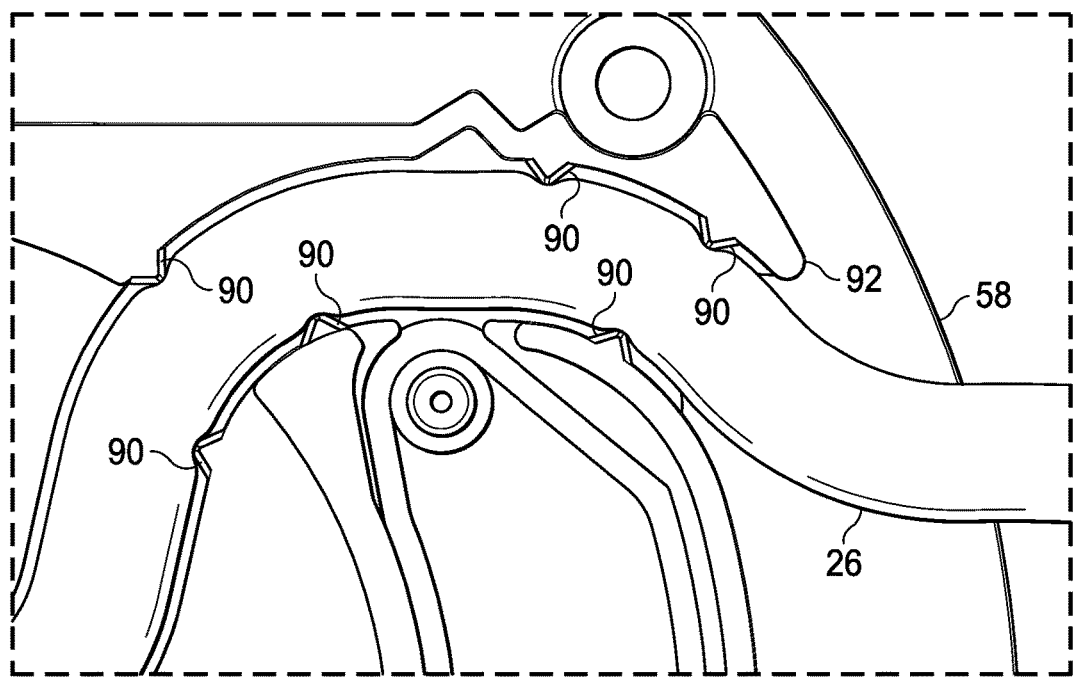

Referring now to FIGS. 12A and 12B, a bottom view depicts cable 26 guided by middle housing portion 58 to a center location through which cable 26 passes to the upper electronics housing portion 14. FIG. 12A depicts a cable guide channel 92 defined by middle housing portion 58 that routes cable 26 to a central location. FIG. 12B depicts cable 26 held in position by cable guide channel 92 and by triangular interference ribs 90 that extend into channel 92 to pinch cable 26. Guide 92 and ribs 90 hold cable 26 at a fixed location so that stress is not placed upon cable connections in electronics housing portion 14 as cable housing portion 16 rotates to extend and retract cable 26. The axis defined by cable guide channel 92 towards the outer perimeter of cable housing portion 16 provides a reference relative to cable plug opening 76 for the amount of cable 26 that extends from housing 12. As the axis of cable guide 92 rotates towards alignment with opening 76, a greater length of cable 26 extends out of housing 12, pushed out by the engagement of the cable against outer wall 80 of cable housing portion 16. Similarly, as the axis of cable guide 92 rotates out of alignment with opening 76, the length of cable 26 is pulled inward by movement of cable guide 92 and engagement with outer wall 80. The length of cable 26 is set so that plug 62 fully retracts into housing 12 as the axis of cable guide 92 rotates from orientation with opening 76 for substantially 360 degrees.

Figure 13:
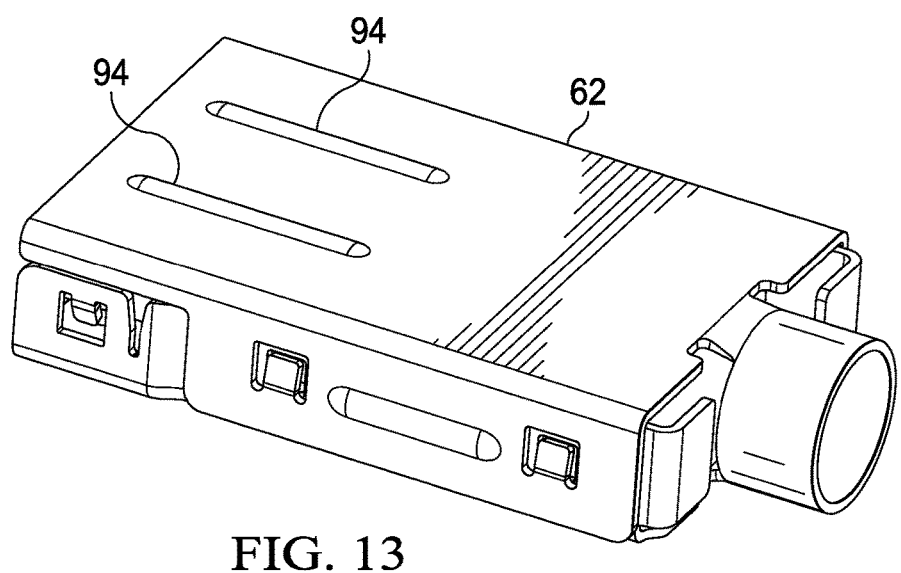
FIG. 13 depicts a side perspective view of the cable plug having an outer protective coating removed.

Referring now to FIG. 13, a side perspective view depicts cable plug 62 having an outer protective coating removed. The ferromagnetic shield around plug 62 has plural raised portions 94 that extend outward, such as by approximately 0.2 mm. For example, a TPE thermoplastic over mold applied to plug 62 has reduced surface coverage at the raised portions 94 so that the air-gap reduction of magnetic attraction is reduced relative to the magnet 66 integrated with middle housing portion 58. In an alternative embodiment, raised portions 94 may include a magnet or magnetic material that enhances biasing of plug 62 into housing 12 at the home position. For example, a magnet integrated in plug 62 has opposing poles relative to magnet 66 when plug 62 is at the home position so that a greater bias is applied to draw plug 62 into housing 12 at the home position. As cable housing portion 16 rotates relative to cable 26, the stiffness of cable 26 biases plug 62 outward and away from housing 12. In another alternative embodiment, raised portion 94 may be exposed after encapsulation by the thermoplastic.

Figure 14:
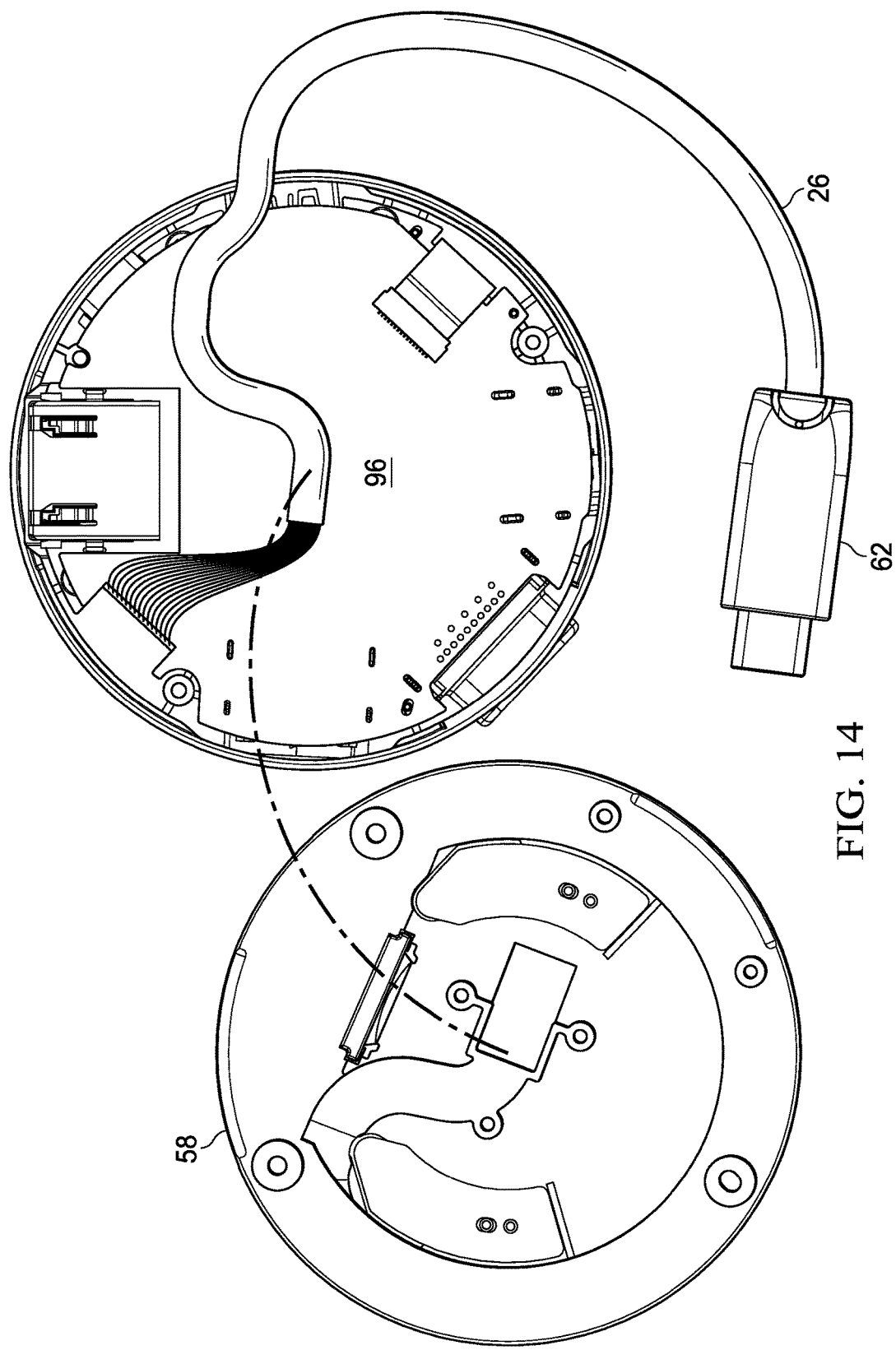
FIG. 14 depicts a bottom view of the upper electronics housing portion having the middle housing portion removed.

Referring now to FIG. 14, a bottom view depicts upper electronics housing portion 14 having middle housing portion 58 removed. A printed circuit board assembly 96 couples to upper electronics portion 14 and interfaces with cable 26 as describe in greater detail below. Cable 26 inserts through an opening at the center of middle housing portion 58, from which cable 26 travels into the cable channel. During assembly of mobile adapter peripheral 10, printed circuit board assembly 96 is coupled into housing portion 14 and then middle housing portion 58 couples to housing portion 14 to prepare for assembly of the cable housing portion 16.

Figure 15:
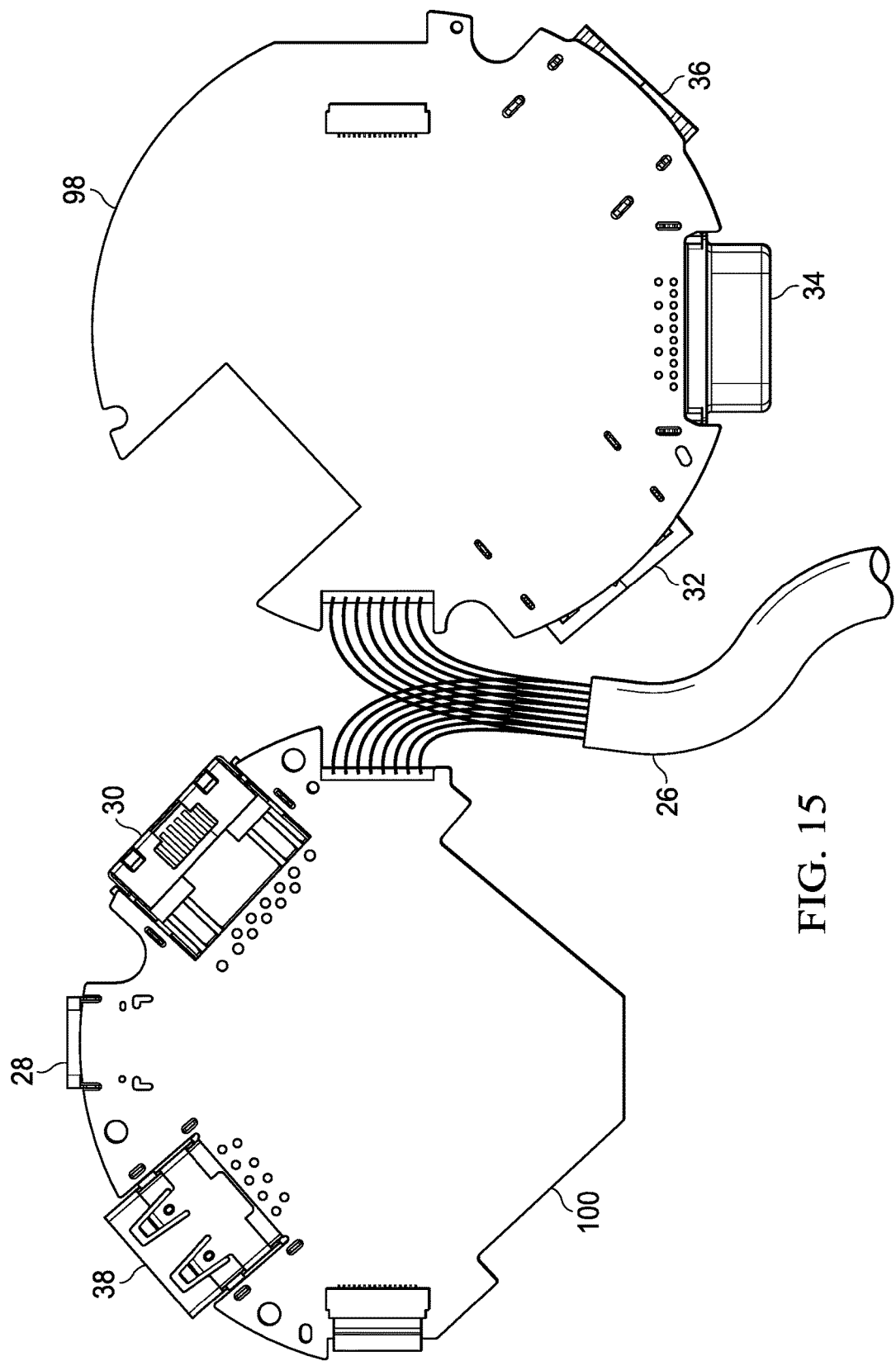
FIG. 15 depicts a bottom view of a video printed circuit board and an upper view of a communications printed circuit board are depicted coupled to the cable.

Referring now to FIG. 15, a bottom view of a video printed circuit board 98 and an upper view of a communications printed circuit board 100 are depicted coupled to cable 26. Video printed circuit board 98 directly connects with wirelines of cable 26 that support video communications under the USB Type C standard. Communications printed circuit board 100 directly connects with wirelines of cable 26 that support other USB Type C defined functions, such as communication of data through a serial interface, transfer of power and ground interface. Cable 26 terminates from a coaxial form into individual leads that couple directly to separate circuit boards 98 and 100, such as with a hot bar soldering process that keeps the soldering points close to each other without a short circuit developing. Once wirelines of cable 26 are coupled to the circuit boards, video printed circuit board 98 flips over and on top of communications printed circuit board 100 to fit a notched portion around RJ45 port 38. The printed circuit board assembly 96 then fits as an assembly into upper electronics housing 14.

Figure 16:
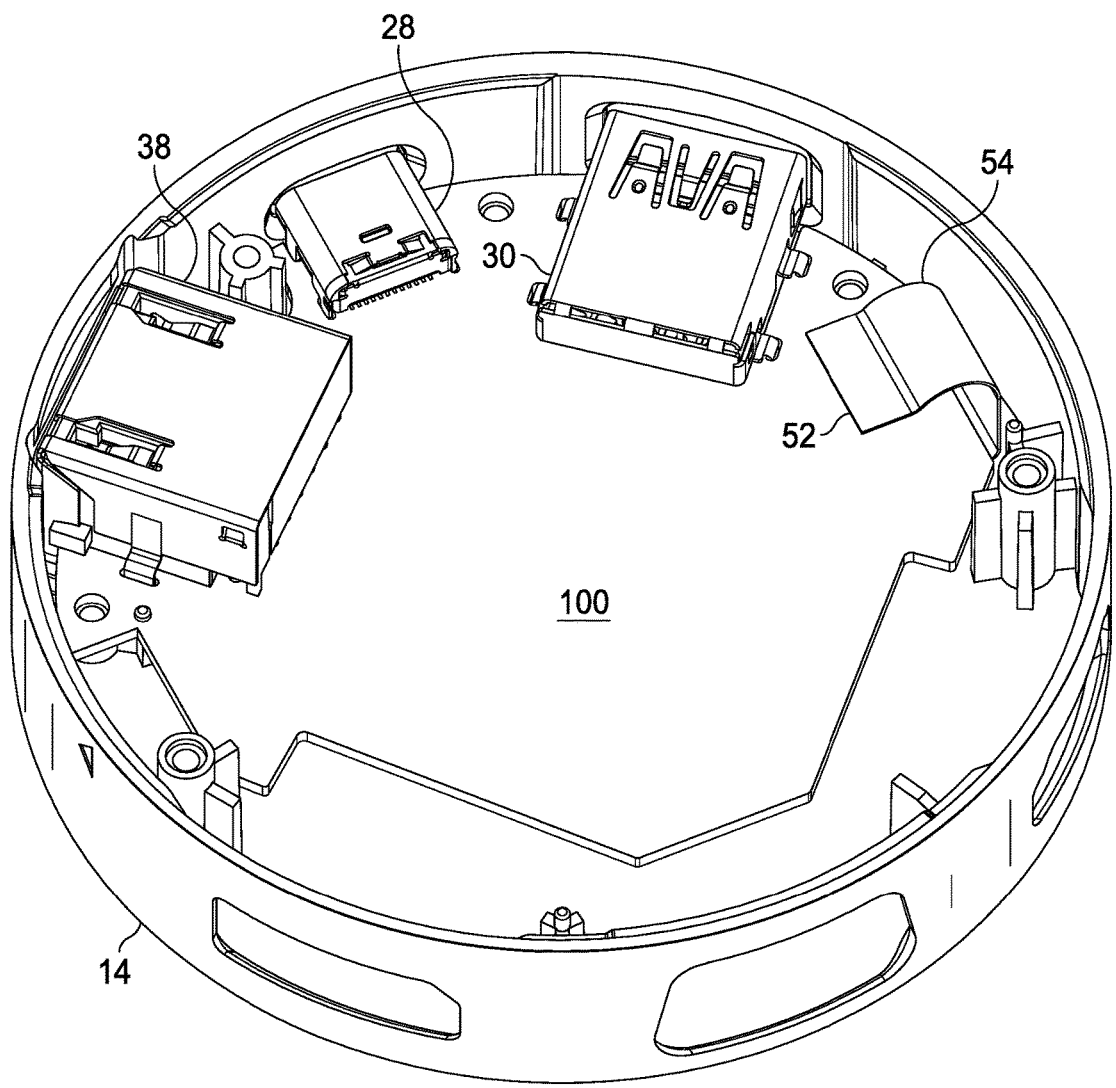
FIG. 16 depicts a side perspective view of the communications printed circuit board coupled into the electronics housing portion.

Referring now to FIG. 16, a side perspective view depicts communications printed circuit board 100 coupled into electronics housing portion 14. RJ45 port 38 is inserted first by angling downward into an opening of upper electronics housing portion 14, and then the USB ports 28 and 30 fit into place. Once communications printed circuit board 100 is inserted into place, screws pass through circuit board 100 to couple it to upper electronics housing portion 14. To improve assembly efficiency, inner walls of housing portion 14 are thinned with step and chamfer features to avoid interference with ports 28, 30 and 38. In addition, circuit board 100 has a squared off form factor opposite ports 28, 30 and 38 to enhance assembly efficiency with circuit board 98 avoiding interference during insertion into housing portion 100.

Figure 17:
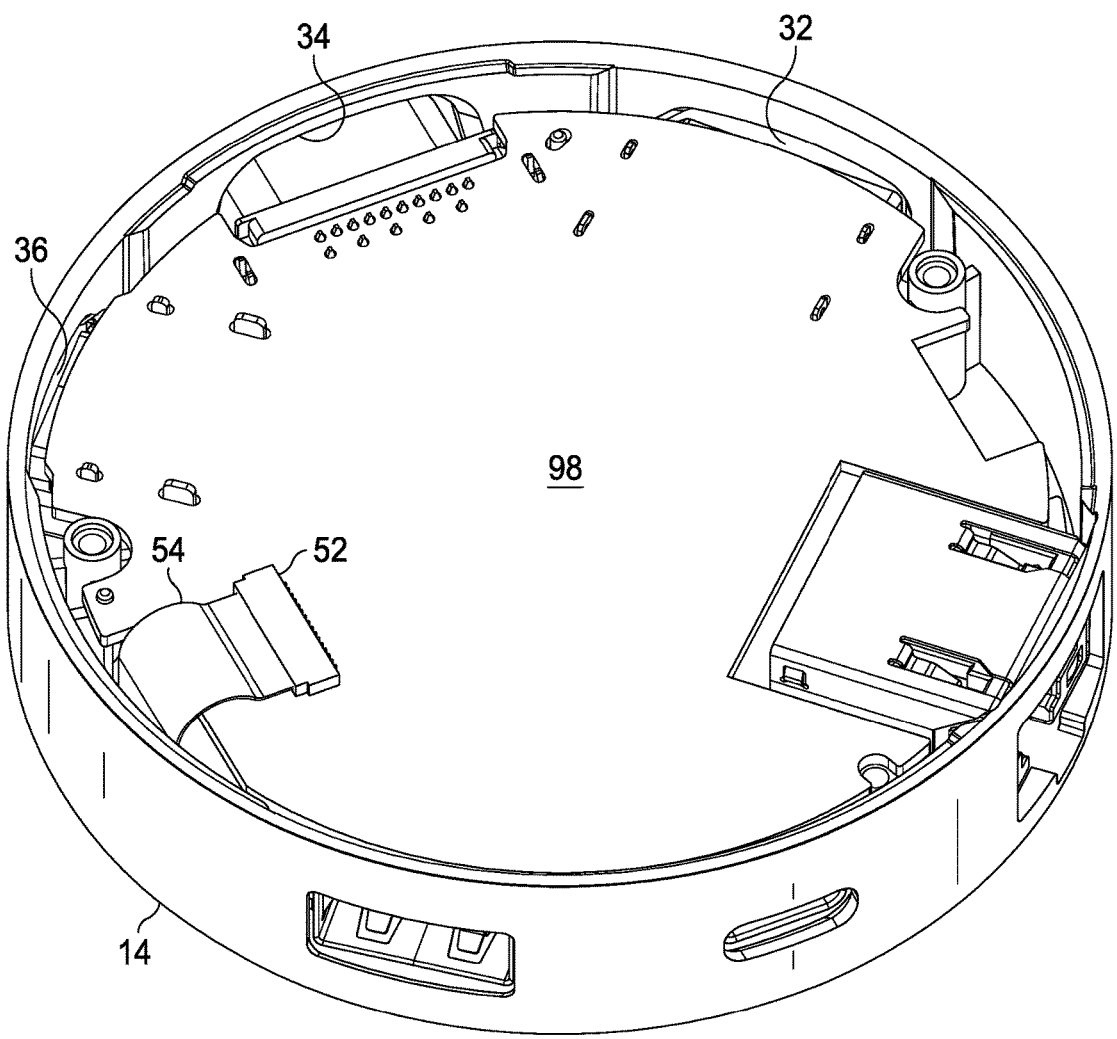
FIG. 17 depicts a side perspective view of the video printed circuit board coupled into the electronics housing portion over communications circuit board.

Referring now to FIG. 17, a side perspective view depicts video printed circuit board 98 coupled into electronics housing portion 14 over communications circuit board 100. Circuit board 98 includes a square notch that fits around RJ45 port 38 as circuit board 98 inserts ports 32-36 into housing portion 14. Referring back to FIG. 15, circuit board 98 rotates relative to circuit board 100 so that ports 28-32 fit into openings of housing portion 14 at the squared off portions of circuit board 100. Wirelines of cable 26 that couple to separate circuit boards 98 and 100 remain in close proximity after assembly of circuit board 98 over top of circuit board 100. Cable 26 extends outward from the circuit board assembly 96 to fit through an opening of middle housing portion 58 and into the cable guide defined thereby in cooperation with the outer walls of lower cable housing portion 16. In the example embodiment, communications circuit board 100 has a circular shape at the locations where ports couple, and has a square off perimeter opposite the ports to aid insertion of the ports along the circular perimeter of housing 12 without opposing edges of circuit board 100 interfering with housing 12. Circuit board 98 vertically stacks circuit board 100 with cutout portions formed to minimize spacing between the vertically stack circuit boards, such as to provide room for vertical stacking around RJ45 port 38.

Figure 18:
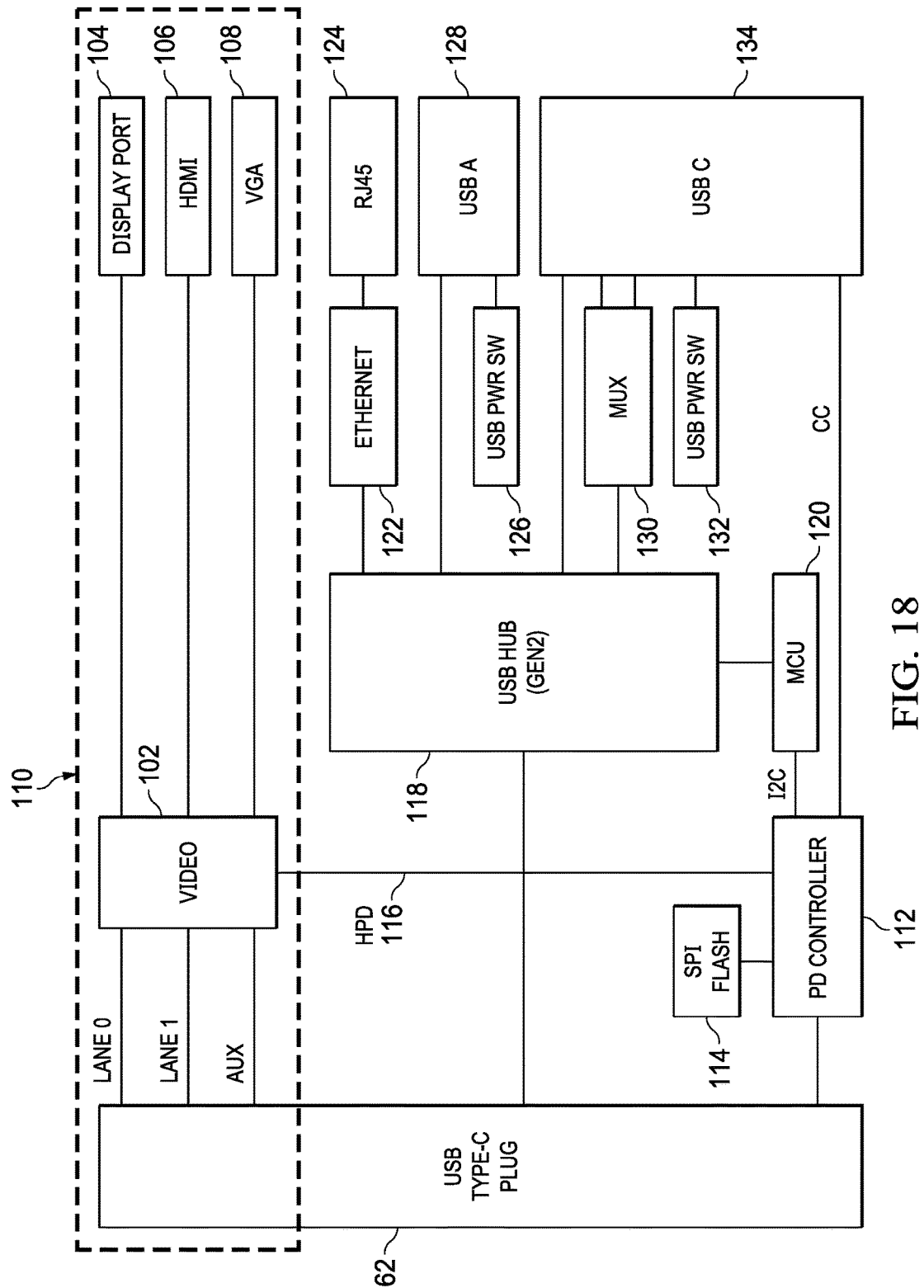
FIG. 18 depicts a circuit block diagram of electronics components disposed on the video printed circuit board and communications printed circuit board that couple to a USB Type C plug.

Referring now to FIG. 18, a circuit block diagram depicts electronics components disposed on video printed circuit board 98 and communications printed circuit board 100 that couple to a USB Type C plug 62. A first set of components 110 are included on video printed circuit board 98 to process video information provided from an information handling system 10 into a protocol requested at a port in use. In the example embodiment, USB Type C wirelines that support video lanes zero, one and auxiliary are routed to a video processor 102 that converts the USB Type C video information into DisplayPort, HDMI and/or VGA protocols. DisplayPort output proceeds from video processor 102 to DisplayPort circuits 104 that couple with DisplayPort port 36. HDMI output proceeds from video processor 102 to HDMI circuits 106 that couple with HDMI port 32. VGA output proceeds from video processor 102 to VGA circuits 108 that couple to VGA port 34. Collectively, circuits 110 interface through printed circuit board 98 so that video signals are managed separately from other data communications. Separate communication of video signals minimizes crosstalk and other interference that can result when multiple protocols are communicated simultaneously within a limited board space.

Components outside of the set of video components 110 are included in communications printed circuit board 100 and managed by a controller 112 interfaced with a memory 114 and a command and control line of USB Type C plug 62. Data from data wirelines of plug 62 proceeds to a USB hub 118 managed by a controller 120. From USB hub 118, Ethernet data proceeds to an Ethernet processor 112 and then RJ45 circuits 124 for communication to RJ45 port 38. From USB hub 118, USB data proceeds directly to USB A circuits 128 and USB C circuits 134, and from there to the appropriate USB port 28 or 30. In addition, a USB power subsystem 126 for USB A and 132 for USB C interfaces with USB A circuits 128 and USB C circuits 134 to provide power in accordance with the USB A and C standards. For example, USB A power subsystem 126 provides power provided out from an information handling system through port plug 62 to USB A circuits 128, and USB C power subsystem 132 provides two way power transfer from and to the information handling system.

In operation, controller 112 directs video processor 102 and USB hub 118 to convert data to a desired format, such as based upon cables coupled to one or more of ports 28-38. Flexible cable 54 communicates control commands from controller 112 through a wireline 116 to video processor 102, such as though an SPI or I2C link. Ground and power are also provided to video printed circuit board 98 components 110 through flexible cable 54 so that a direct power connection from plug 62 to circuit board 98 is not needed.

Although the present invention has been described in detail, it should be understood that various changes, substitutions and alterations can be made hereto without departing from the spirit and scope of the invention as defined by the appended claims.

What is claimed is:

1. A mobile peripheral adapter comprising:
a first circular housing portion having plural port openings;
a second circular housing portion having a cable opening, the second circular housing portion rotationally coupled to the first circular housing portion;
plural ports disposed at the plural port openings, each port operable to accept a predetermined cable plug;
electronic components disposed in the first circular housing and operable to convert information to one or more protocols for communication through one or more of the plural ports; and
a cable terminating at one end at the electronic components and at an opposing end at a plug, the cable routing from the electronic components into the second circular housing along a cable guide and to the cable opening, the cable extending from the cable opening as rotation of the first and second housing portions brings the cable guide into alignment with the cable opening, the cable retracting into the cable opening as rotation of the first and second housing portions brings the cable guide out of alignment with the cable opening;
wherein the plural ports include at least plural video ports and plural data ports, the plural video and data ports communicating information in a protocol other than a protocol associated with the cable, the video ports coupled to a video circuit board, the data ports coupled to a communication circuit board separate from the video circuit board, the cable having video wirelines coupled directly to the video circuit board that communicate video information and all other wirelines coupled to the communications circuit board, the communication circuit board providing power and ground to the video circuit board through a flexible cable.

2. The mobile peripheral adapter of claim 1 further comprising:
a middle housing portion disposed between the first and second circular housing portions and defining the cable guide; and
an outer wall defined by the second circular housing portion, the cable guide pressing the cable within the second circular housing portion against the outer wall.

3. The mobile peripheral adapter of claim 2 further comprising a magnet integrated in the middle housing portion proximate the cable opening and aligned to bias the cable plug into the housing.

4. The mobile peripheral adapter of claim 3 wherein the cable plug comprises a metallic housing having a raised portion of metallic material covered with a thermoplastic, the raised portion approaching the thermoplastic outer surface to reduce distance of metallic material to the magnet when the plug enters the housing.

5. The mobile peripheral adapter of claim 3 wherein the cable plug comprises a magnet integrated with the plug and having poles aligned to bias against the middle housing portion magnet as the cable fully retracts into the housing.

6. The mobile peripheral adapter of claim 3 wherein the plug comprises a USB Type C plug.

7. The mobile peripheral adapter of claim 3 wherein the cable opening is defined at least in part by a chamfered edge overlapping along the middle housing portion and the second housing portion.

8. The mobile peripheral adapter of claim 3 further comprising:
a spindle fitting into an opening at the second housing portion, the spindle fixedly coupled to the middle housing portion;
wherein the second housing portion rotates about the spindle relative to the first housing portion.

9. A method for managing a cable at a mobile peripheral adapter, the method comprising:
coupling the cable to electronic components of a first circular housing portion, the cable having video wirelines and other wirelines, the electronic components disposed on a video circuit board or a communications circuit board;
routing the cable out a central location of the first circular housing and into a cable guide, the cable guide directed along an axis from the center location towards an outer perimeter of a second circular housing portion;
maintaining the cable within the second circular housing portion between an outer wall of the second circular housing portion and an inner wall of the cable guide, the second circular housing portion having a cable plug opening; and rotating the first and second housing portions to retract and extend the cable based upon the orientation of the cable guide axis and the cable plug opening;
coupling the video wirelines of the cable to the video circuit board integrated in the first housing portion;
coupling the other wirelines of the cable to the communications circuit board integrated in the first housing portion, the video circuit board separate from the communications circuit board;
coupling a flexible cable directly between the video circuit board and communications circuit board; and
providing power and ground from the communications circuit board to the video circuit board through the flexible cable.

10. The method of claim 9 further comprising:
integrating a magnet proximate the cable plug opening; and
biasing the cable plug to fully retract into the opening with the magnet.

11. The method of claim 10 further comprising:
integrating a raised portion of ferromagnetic metal in the cable plug; and
encapsulating the cable plug with thermoplastic, the raised portion exposed and proximate the magnet in the retracted position of the cable.

12. The method of claim 10 further comprising:
integrating a magnet in the cable plug; and
aligning opposing poles of the cable plug magnet and the cable plug opening magnet at full retraction of the cable plug into the opening.

13. The method of claim 9 further comprising:
receiving at the electronic components video information from an information handling system interfaced with the cable;
converting with the electronic components the video information to a video output protocol selected from plural video output protocols; and
outputting the video information from a port exposed at the first circular housing portion associated with the video output protocol.

14. The method of claim 13 further comprising:
selecting the video output protocol from one of a VGA protocol, an HDMI protocol and a DisplayPort protocol.

15. The method of claim 9 wherein rotating the first and second housing portions further comprises:
coupling a middle housing portion to the first housing portion in a fixed manner, the middle housing portion having the cable guide;
inserting a spindle into an opening of the second housing portion; and
coupling the spindle to the middle housing portion, the spindle fixed relative to the first housing portion and rotating relative to the second housing portion.

16. An adapter to convert video information from USB protocol to a selected of plural video protocols, the adapter comprising:
a circular housing having first and second portions rotationally coupled to each other;
a USB cable extending out of the second housing portion and having video wirelines interfaced with video protocol converters disposed in the first housing portion on a first circuit board, the USB cable having power and ground wirelines interfaced with a second circuit board;
a flexible cable providing the power and ground from the second circuit board to the first circuit board; and
plural video ports disposed along the perimeter of the first housing portion and interfaced with the video protocol converters;
wherein rotation of the first and second portions relative to each other engages the USB cable to retract the USB cable into the housing in response to rotation in a first direction and extend the USB cable out of the housing in response to rotation in a second direction.

17. The adapter of claim 16 further comprising:
a magnet integrated in the circular housing proximate an opening through which the cable extends; and
raised metallic material integrated in a plug of the cable and exposed proximate the magnet upon retraction of the cable in the housing, the metallic material interacting with the magnet to bias the plug into the housing.

18. The adapter of claim 16 further comprising plural data communication ports disposed along the perimeter of the first housing portion including at least an Ethernet port having bidirectional information communication with the USB cable, the data communication ports coupled to the second circuit board, the video ports coupled to the first circuit board that is separated from the second circuit board.

* * * * *